Jan. 19, 1937.  D. E. STUMP, JR  2,068,475
AIR CONDITIONER
Filed Jan. 4, 1936   2 Sheets-Sheet 1

Dennis E. Stump, Jr. INVENTOR
BY Victor J. Evans & Co.
ATTORNEY

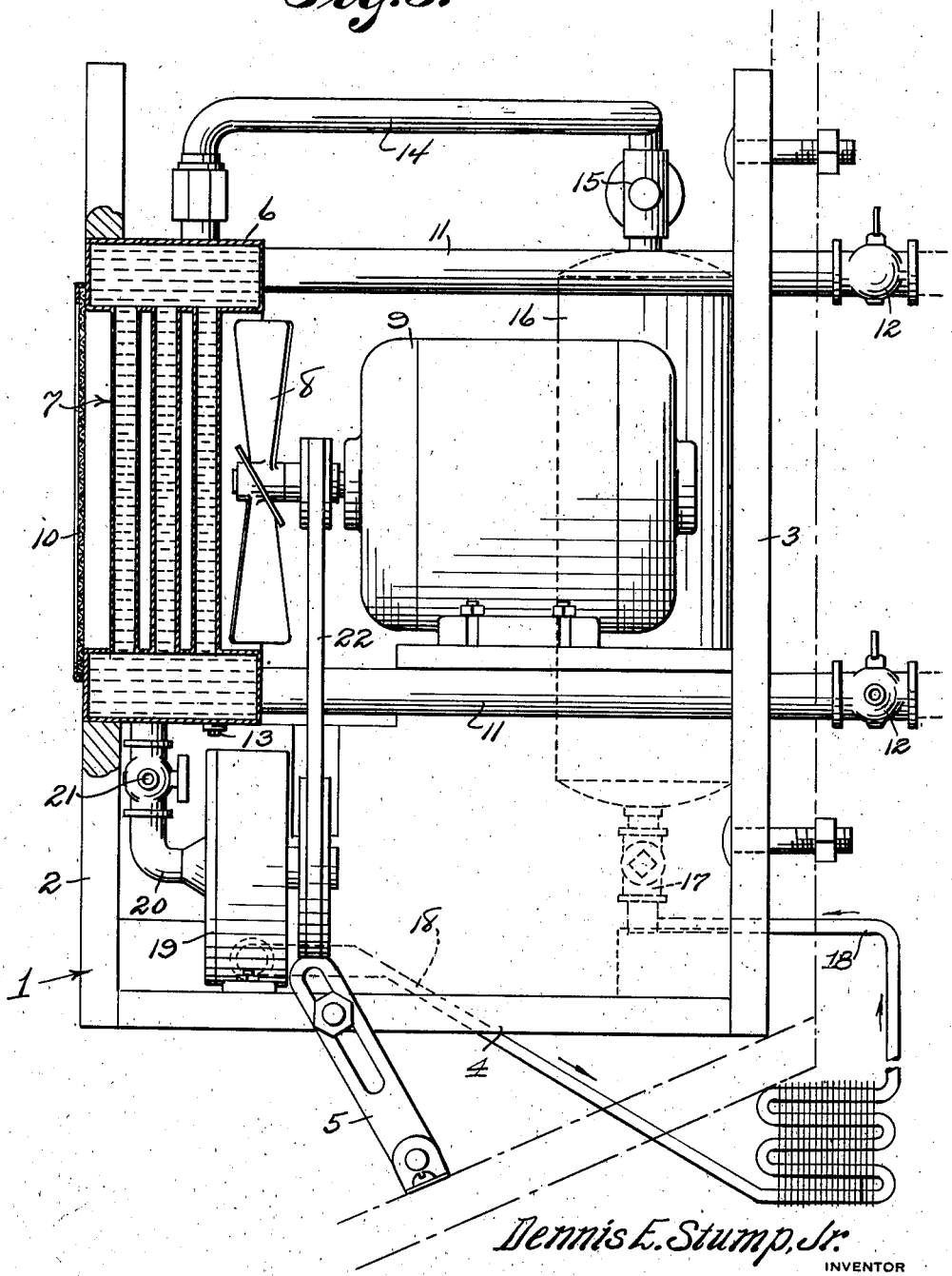

Patented Jan. 19, 1937

2,068,475

UNITED STATES PATENT OFFICE 2,068,475

AIR CONDITIONER

Dennis E. Stump, Jr., Denver, Colo.

Application January 4, 1936, Serial No. 57,608

1 Claim. (Cl. 257—7)

This invention relates to air conditioners and has for the primary object the provision of a device of this character which will be simple, durable and compact so that the device may be employed on motor vehicles for either heating or cooling the occupants compartment of said vehicle and which may be manufactured and sold at a low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a front elevation, partly in section, illustrating an air conditioner constructed in accordance with my invention.

Figure 3 is a side elevation, partly in section, illustrating the device.

Figure 1:
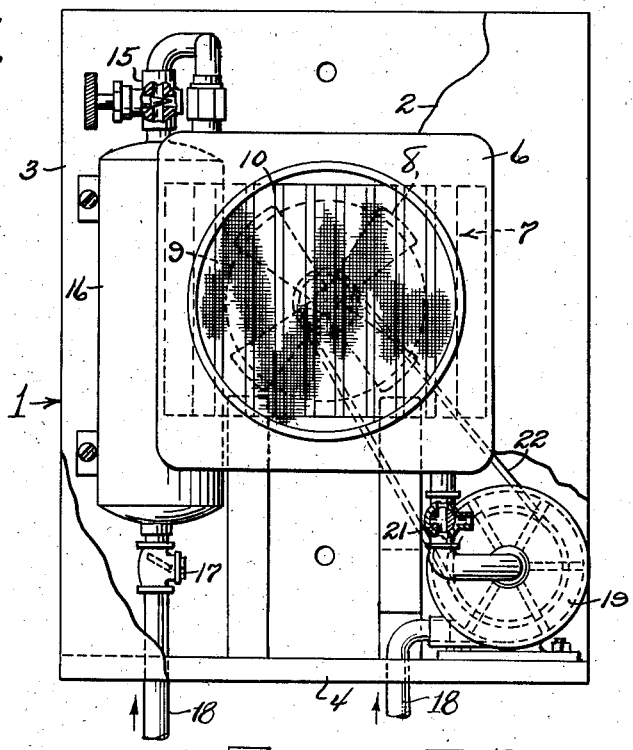
Figure 2:
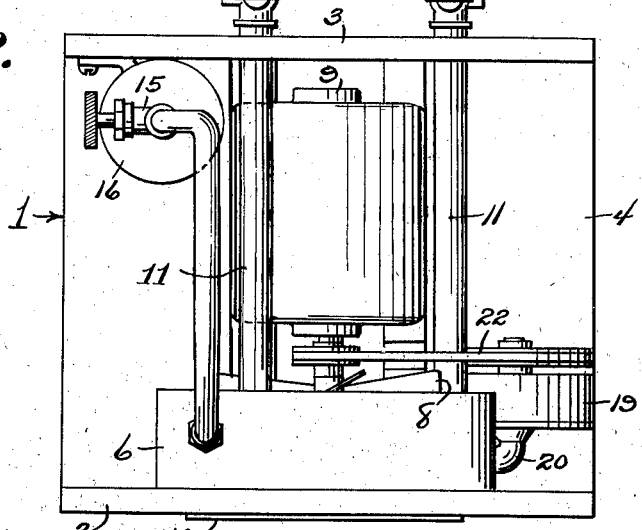
Figure 2 is a top plan view illustrating the same.

Referring in detail to the drawings, the numeral 1 indicates a suitable support which may be conveniently mounted within the occupant compartment of a motor vehicle or within a room or a building wherein it is desired to condition the air. While this invention is capable of use in many places for the purpose of conditioning air, it is primarily adaptable for a motor vehicle. The support includes front and rear walls 2 and 3 and a bottom wall 4. The rear wall 3 is bolted or otherwise secured to the motor vehicle while the bottom wall 4 is supported by an adjustable brace 5 secured to the motor vehicle. The front wall 2 has an opening in which is mounted a radiator 6, the core being indicated at 7. The radiator is of the type wherein either liquid or gas may be passed therethrough and air may be caused to pass through the core for the purpose of either heating the air or cooling the air. The circulation of the air through the core is by the rotation of a fan 8 driven by an electric motor 9. The electric motor is connected in an electric circuit of the motor vehicle and controlled by a suitable switch (not shown). Arranged in front of the core of the radiator is a screen 10 for the purpose of removing foreign matter from the air passing from the core of the radiator. Connected to the upper and lower ends of the radiator 6 are pipes 11 having control valves 12. The pipes 11 are adapted to be connected to the cooling system of the engine of the motor vehicle so that when the valves 12 are opened heated water may pass through the radiator 6 and with the electric motor in operation air will be driven through the core of the radiator so as to absorb the heat from the fluid passing through the radiator and thereby become heated for the purpose of heating the occupant compartment of the motor vehicle. The valves 12 may be closed when it is desired to discontinue the heating of the motor vehicle and the radiator drained of the liquid by removing a drain plug 13. After the emptying of the radiator the plug 13 is replaced.

A pipe 14 has one end connected to the upper end of the radiator 6 and the other end to a regulating valve 15. The regulating valve 15 is connected to the discharge end of a storage tank 16 which is suitably mounted on the support 1. The inlet of the tank 16 has connected thereto a check valve 17 which is in turn connected to a pipe 18, a portion of which is of coiled formation to provide a condenser coil located outwardly of the vehicle to be air cooled. The other end of the pipe 18 is connected to a pump 19. The pump 19 is carried by the support 1 and is preferably of the rotating type and the inlet thereof is connected to a pipe 20 which is in turn connected to the lower end of the radiator 6. The pipe 20 has a cutoff valve 21. A belt 22 is employed between the electric motor 9 and the pump. To convert this device from a heating means to a cooling means, the pipes 11 are closed by the valves 12 and the tank 16, radiator 6 and pipes connecting the latter to the tank 16 are filled with a gas or liquid refrigerant. The device thus converted will produce an air cooling means by starting the electric motor 9, which drives the pump 19. The valve 15 is adjusted to regulate the escape of the refrigerant from the tank 16, the pump acting to compress the refrigerant in the tank 16. The refrigerant under pressure in the tank 16 escapes to the pipe 14 and to the radiator 6 where it expands and absorbs heat from the air driven through the radiator core by the fan 8 so that the air leaving the radiator core will be chilled for the purpose of lowering the temperature in the occupant compartment of the vehicle.

A device of this character is compact, simple and durable and may be readily adapted to a motor vehicle now in use for the purpose of conditioning the air to the occupant compartment either heating the air or chilling the air, depending in which time of the year the device is in use. Due to the simplicity and compactness of this device its cost of manufacture and installation will be reduced to a minimum.

Having described the invention, I claim:

An air conditioner comprising a support including spaced vertically arranged walls and a connecting bottom wall and one of said vertical walls having an opening, a radiator including a core mounted in said opening so that air may circulate through the core, a fan for circulating the air through the core, an electric motor for driving said fan and carried by one of the vertical walls, pipes for circulating a heated fluid taken from a cooling system of an engine through the radiator and passing through one of the vertical walls and supported thereby, valves in the pipes for discontinuing the circulation of heated fluid through the radiator, a pump carried by the connecting bottom wall and connected to the radiator and driven by said motor, a storage tank carried by said support, a pipe connecting the pump to said tank and including an expansion coil located outwardly of the support, means connecting the tank to the radiator, a regulating valve in said last means, a cutoff valve between the pump and the radiator, and a check valve between the pump and the tank.

DENNIS E. STUMP, Jr.